E. HAAKENSON.
AUTOMOBILE JACK.
APPLICATION FILED JULY 6, 1916.

1,217,757.

Patented Feb. 27, 1917.

WITNESSES
Frederick Diehl.
J. E. Larsen

INVENTOR
E. Haakenson
BY
ATTORNEYS

UNITED STATES PATENT OFFICE.

ERIK HAAKENSON, OF TACOMA, WASHINGTON.

AUTOMOBILE-JACK.

1,217,757.         Specification of Letters Patent.      Patented Feb. 27, 1917.

Application filed July 6, 1916. Serial No. 107,730.

*To all whom it may concern:*

Be it known that I, ERIK HAAKENSON, a citizen of the United States, and a resident of Tacoma, in the county of Pierce and State of Washington, have invented certain new and useful Improvements in Automobile-Jacks, of which the following is a specification.

My invention relates to jacks, particularly adapted for use with vehicles, by means of which an automobile may be raised entirely from the ground or from the floor of a garage in one operation, and the main object thereof is to provide such a jack which folds into compact form when not in use, which is of the utmost simplicity in construction and use, which is capable of great lifting power with relatively little effort, which is self-locking when supporting its load, and which is comparatively inexpensive.

My invention is fully described in the following specification, of which the accompanying drawings form a part, in which like characters refer to like parts in each of the views, and in which:—

Figure 1 is a perspective view of my jack collapsed;

Fig. 2 is a view thereof in raised position;

Fig. 3 is a side elevation of a modified form, in raised position; and

Fig. 4 is a view of the form shown in Figs. 1 and 2 with a slight modification in the form of stops thereon.

Referring to the drawings, 5 represents two parallel base beams joined by means of brace members 6 and two rods 7 adjacent the ends thereof carrying, each, two arms 8 joined by a rod 9, one of which is shown curved downwardly to clear the differential housing of an automobile.

The ends of the rods 9 carry beams 10 which may be provided with bearing blocks 11 for the axles of an automobile and, because of the arms 8, the beams 10 are maintained in parallelism with the beams 5 in either raised or lowered position.

Rotatably mounted in the beams 5 is a shaft 12 provided with crank arms 13 adjacent the inner surfaces of the respective beams and provided, each, with a series of holes whereby connecting rods 14 may be adjustably connected therewith to increase or decrease the leverage of the crank arms 13, the other ends of said connecting rods being in pivotal connection with one of the rods 9.

The ends of the shaft 12 are provided with socket members 15, for an operating lever 16, or with any desired equivalent thereof, and I may arrange the shaft 12 and connected parts at any desired position along the length of the beams 5, either between the brace members 6 or at the elongated ends of said beams as shown in Fig. 3, the connecting rods 14 being made of such length as to enable the upper beams 10 to rest upon the beams 5 when in lowered position and to carry the rods 9 slightly past the vertical axial planes of the respective rods 7 when in raised position.

By reference to Fig. 1 it will be noted that the lever 16 rests upon the ground or floor when the jack is collapsed, and also when the jack is raised, as shown in Fig. 2, said lever being movable through an arc of approximately 180 degrees of a circle and, when the jack is raised, said lever serves to maintain the members in desired relationship by so resting upon the ground or floor though toward the opposite end of the jack.

I have found that, whereas in the jack shown in Figs. 1 and 2 the operating lever 16 moves through an arc of approximately 180 degrees of a circle and the operating arms 8 move through approximately 90 degrees of a circle, this ratio may be altered to secure a greater leverage by reducing the travel of the arms 8 and connecting the rods 14 with the crank arms 13 accordingly, and I may employ limiting stops 17 to prevent the upper frame from lowering too far to touch the lower frame and thus shorten the travel of the arms 8.

The operation is obvious. The jack is resting upon the floor of a garage, let us say, and an automobile is driven thereover, after which the jack is raised by means of the lever 16 and the weight of the machine is thus taken from the tires, this being of considerable importance when automobiles are permitted to stand for long periods without use.

While I have shown certain desired structural details, it will be apparent that I may make changes thereover, provided that such changes come within the spirit of the invention and within the scope of the appended claim.

Having fully described my invention, what I claim as new, and desire to secure by Letters Patent, is:—

A jack, comprising lower and upper horizontal frames, a transverse rod adjacent each end of each frame, a pair of arms joining each pair of transverse rods, a shaft in the lower frame, crank arms thereon, rods connecting said crank arms with one of said transverse rods in the upper frame, and an operating lever for said shaft resting upon the jack supporting surface in both collapsed and raised jack positions.

ERIK HAAKENSON.